United States Patent [19]

Jabsen

[11] 4,110,157
[45] Aug. 29, 1978

[54] INDUSTRIAL TECHNIQUE

[75] Inventor: Felix Stanley Jabsen, Lynchburg, Va.

[73] Assignee: The Babcock & Wilcox Co., New York, N.Y.

[21] Appl. No.: 740,637

[22] Filed: Nov. 10, 1976

[51] Int. Cl.² .............................................. G21C 7/08
[52] U.S. Cl. ................... 176/36 C; 403/317; 403/349
[58] Field of Search .............. 176/30, 36; 294/86 A; 403/316, 317, 349

[56] References Cited

U.S. PATENT DOCUMENTS

| | | | |
|---|---|---|---|
| 2,894,779 | 7/1959 | Kushner et al. | 176/36 C |
| 3,079,323 | 2/1963 | Hawke | 176/36 R |
| 3,107,209 | 10/1963 | Frisch | 176/36 C |
| 3,384,549 | 5/1968 | Deliege et al. | 176/36 R |
| 3,462,345 | 8/1969 | Jabsen | 176/36 R |
| 3,486,974 | 12/1969 | Bertone | 176/36 R |
| 3,604,746 | 9/1971 | Notari | 176/36 R |
| 3,691,011 | 9/1972 | Kruger et al. | 176/30 |
| 3,720,580 | 3/1973 | Schabert et al. | 176/36 R |
| 3,762,994 | 10/1973 | Kunzel | 176/36 R |
| 3,853,699 | 12/1974 | Frisch et al. | 176/36 R |

*Primary Examiner*—Samuel W. Engle
*Assistant Examiner*—S. A. Cangialosi
*Attorney, Agent, or Firm*—Joseph M. Maguire; Angelo Notaro

[57] ABSTRACT

An illustrative embodiment of the invention provides a control rod system locking device adapted to engage an elongated extension shaft, releasably coupled at one end to the control rod assembly and releasably coupled at its other end to the control rod drive, to prevent rotation of the shaft about its longitudinal axis with respect to the control rod assembly.

6 Claims, 6 Drawing Figures

INDUSTRIAL TECHNIQUE

BACKGROUND OF THE INVENTION

1. Field of the Invention

This invention relates to control rods for a nuclear reactor and, more particularly, to an extension shaft interconnecting the control rod assembly to the control rod drive and means releasably securing the shaft from rotation about its longitudinal axis.

2. Description of the Prior Art

Typically, a nuclear reactor for the generation of electrical power comprises a longitudinally disposed cylindrical pressure vessel closed at both ends having a core of fissionable material which heats a primary coolant. The fissionable material is enclosed in elongated fuel rods assembled in bundles commonly called fuel assemblies. Moreover, a control rod assembly, i.e. a plurality of interconnected control rods, disposed in passageways or guide tubes within each fuel assembly is provided to control the reaction rate of the fissionable material. Each control rod assembly is moveably mounted within the fuel assembly passageways for motion into and out of the core for adjustment of neutron absorption in relation to the effective position of the control rod within the core. Thus, as the conrol rods are moving into the core, neutron poison material such as cadmium, boron, cobalt, or their alloys is introduced and the power level of the reactor is reduced. Moreover, in most reactors, complete insertion of the control rods within the core terminates the chain reaction of the fission process. Conversely, withdrawal of the control rods from the core reduces the poison level or neutron capture cross-section which increases the chain reaction. Therefore, accurate power regulation as well as complete termination of the chain reaction is accomplished by the control rod assembly.

For the commonly known land based pressurized water nuclear reactor, the heated primary coolant flows out of the nuclear pressure vessel and into at least one secondary coolant heat exchanger wherein the secondary coolant is heated to superheated steam conditions. In nuclear marine propulsion plants, however, the constraints of size, volume and mass of the nuclear system are, in the least, limited. For example, one type of nuclear system proposed for marine propulsion provides a pressure vessel that encloses the reactor core and, also, the secondary coolant heat exchangers. Accordingly, this consolidated nuclear steam generator or CNSG comprises; an elongated pressure vessel, a reactor core centrally disposed within the lower portion of the pressure vessel forming an annulus between the vessel and the core for primary coolant flow, an annular secondary heat exchanger vertically disposed above the core forming an elongated cylindrical plenum directly above the core and associated vessel equipment.

The operation of a nuclear reactor moreover periodically requires the removal of fuel rods from the core for refueling, maintenance, or the like. Accordingly, this requires the removal of the reactor vessel head together with the control rod drive systems mounted thereon. After the vessel head has been removed the reactor internals above the core must also be removed to expose the fuel assemblies which can then be retracted from their positions within the reactor core. Naturally, the reactor must be in a shutdown condition during this operation and maintenance of the shutdown condition is performed by each of the control rod assemblies completely inserted within the fuel assembly passageways or guide tubes provided therefor. Accordingly, means must be provided to disengage the completely inserted control rods from their respective drive systems during removal of the reactor head in order to prevent accidental withdrawal of a control rod from its fuel assembly during head removal. In the common pressurized water type nuclear reactor only one releaseable connection or coupling between each of the control rod assemblies and their respective drive systems is needed or provided. However, for the CNSG type nuclear reactor described above in which the reactor core is displaced substantially below the reactor vessel head with respect to a like sized core of a land based nuclear reactor, the problem of disengagement of the control rod assembly from its drive system is more complicated. The increased space above the core of this type CNSG reactor requires that the control rods be connected to their respective control drives by means of exceptionally long drive shafts. Moreoever, the refueling, maintenance or the like, disengagement or re-attachment of the control rod assemblies and their drive systems of this type (CNSG) reactor to the long drive shafts connected therebetween presents increased alignment and radioactive exposure problems, as well as additional space and storage problems. For example, with as many as 60 control rod drives each coupled to at least one control rod, but usually to a control rod assembly comprising a plurality of connected rods, through a "spider" arrangement, the storage, maneuverability and handling of the reactor head and associated long drive shafts is in the least burdensome. In addition, blind alignment, during head re-attachment, of the exceptionally long shafts to control rod assemblies displaced significantly distant from the reactor head or top portion of the nuclear vessel is exceedingly more difficult. As a result, it has been suggested to interconnect the control rods to an extension shaft coupled to the drive system. In this manner coupling and uncoupling of the reactor head and associated drive system would not vary from present methods and no exceptionally long shafts with their above mentioned problems would be attached thereto. However, an interconnecting extension shaft must also couple and uncouple with its respective control rod or control rod assembly. Moreover, it is necessary that coupling or uncoupling of the control rod drive to or from its extension shaft does not uncouple the control rod assembly from its extension shaft. That is, during the start up or shutdown procedure it is essential that accidental uncoupling of the control rod from its extension shaft is prevented.

Accordingly, it has also become necessary to provide interconnection means to the control rod assemblies which insure the complete insertion of the rods within the fuel assembly guide tubes provided therefor and which relieve the problems of alignment, storage, radiation exposure and the like as mentioned above. Moreover, the interconnection means must also provide securing means which prevent accidental uncoupling of the control rod assembly from its respective drive.

SUMMARY OF THE INVENTION

In accordance with the invention, the difficulties with respect to coupling, handling and the like of the control rod assembly of a nuclear reactor of the CNSG type are to a great extent alleviated through the practice of this invention.

Specifically, the control rod system for a nuclear reactor according to this invention comprises control rod drive means, guide means, and means coupling a control rod assembly to the drive means for reciprocal movement of the rod assembly into and out of a nuclear reactor core. The control rod assembly coupling means includes an extension shaft removeably attached at one end to the control rod assembly by means of a bayonet coupling, and removeably attached at its other end to the drive means in a like manner.

More specifically, an embodiment of this invention includes an extension shaft having securing means thereon cooperating with the guide means for releasably securing the shaft from rotation with respect to the control rod. The securing means, moreover, comprises an axially aligned and outwardly extending key in the shaft cooperating with and adapted to slide in a slotted passageway aligned with the key in the guide means. The key-slot arrangement prevents rotation of the shaft when the key is disposed in the slot, thereby ensuring the coupling or locking of the shaft-control rod assembly combination. In addition the securing means includes a vertically biased ring member forming the slotted passageway. The ring member is vertically biased in the axial direction of the shaft to permit the bayonet coupling of the shaft to the control rod in its fully extended position within the fuel assembly.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENTS OF THE INVENTION

For a more complete appreciation of the invention, attention is invited to the following description of an illustrative embodiment of the invention, as shown in the attached drawings.

Figure 1:
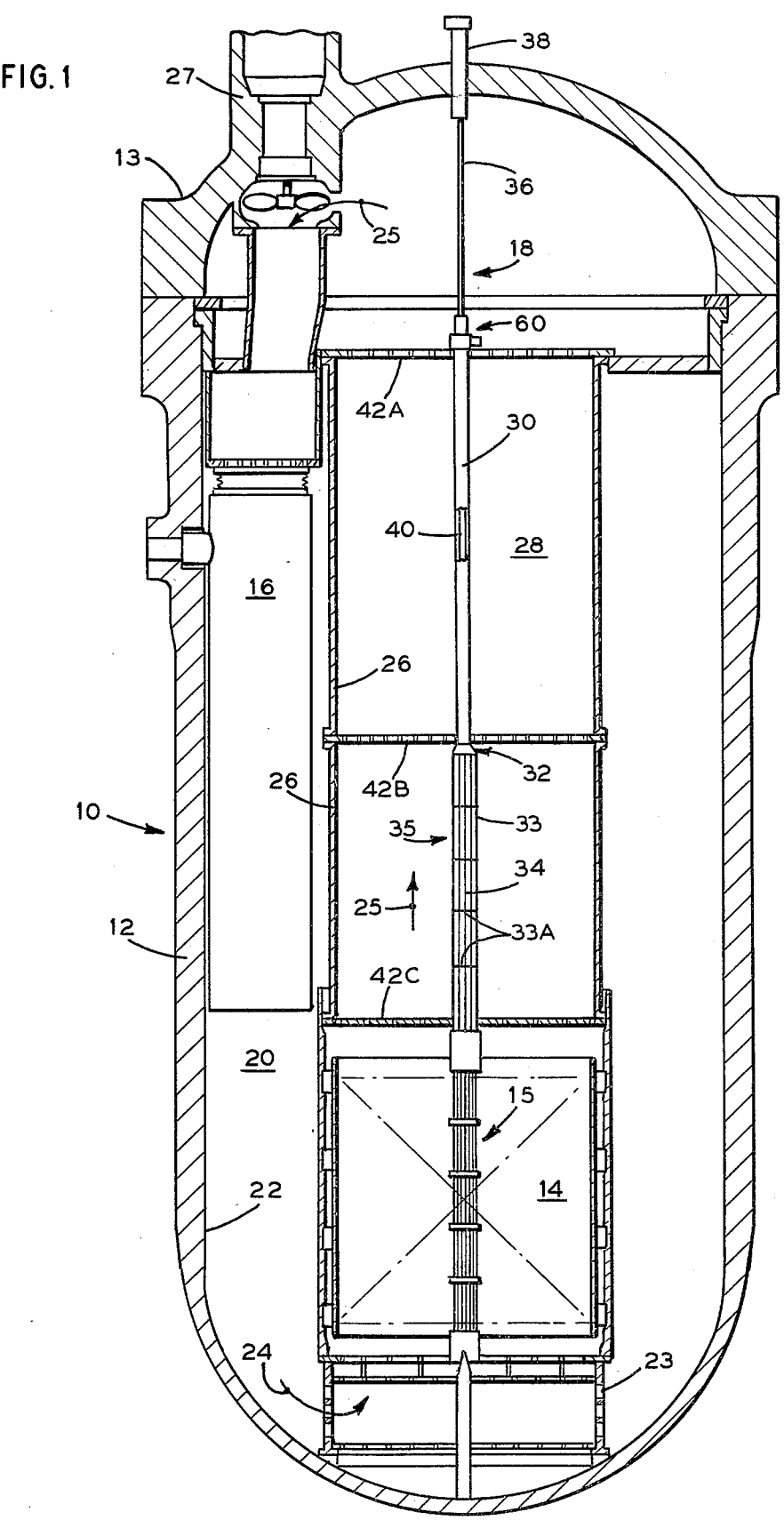
FIG. 1 is a front elevation in full section of a nuclear reactor pressure vessel that embodies principles of the invention.

As illustrated in FIG. 1, a nuclear reactor 10 of the consolidated nuclear steam generator (CNSG) type explained above comprises a generally cylindrical and vastly elongated pressure vessel 12 having a head 13 enclosing a reactor core 14, an annular secondary coolant heat exchanger 16, a control rod system 18 and other associated equipment and structures for heating a circulating primary coolant. As mentioned above, the primary coolant of this type CNSG reactor does not flow out of the pressure vessel to heat a secondary fluid, as is typical with the commonly known pressurized nuclear reactors, because the secondary fluid coolant heat exchanger 16 is housed within the pressure vessel 12. Accordingly, in order to accommodate the large secondary coolant heat exchanger 16 as well as to provide a fluid flow path for the primary coolant, the pressure vessel 12 of this type nuclear reactor is somewhat more elongated than a typical, land based, pressurized water reactor of the same size reactor core.

The reactor core 14, including a plurality of fuel rods or elements, arranged in fuel assemblies 15 (only one being illustrated in FIG. 1) is centrally disposed and axially displaced downwardly within the vessel 12. The core 14 and an inner wall 22 of the vessel 12 form a hollow annular fluid flow passageway 20 to accommodate the primary coolant flowing out of the heat exchanger 16 in the direction indicated by means of an arrow 24 to the core 14 through a perforated core support structure 23. A vertically disposed cylindrical shroud 26 is positioned above and in general alignment with the core 14 to form an upper plenum or internals portion 28 that channels heated primary coolant rising through the core 14 in the direction of arrows 25 through a pump 27 to the annular heat exchanger 16 radially displaced about the plenum. In addition, the internals 28 include guide tubes 30 (only one being shown), guide assemblies 32 (only one being shown), and grids $42_A$, $42_B$, $42_C$ to provide an aligned passageway for the control rod system 18. In addition, the guide assembly 32 including a shell 33 and slotted guideways $33_A$ provides alignment structure for each control rod 34 of a control rod assembly 35 that regulate the operation of the reactor.

Figure 2:
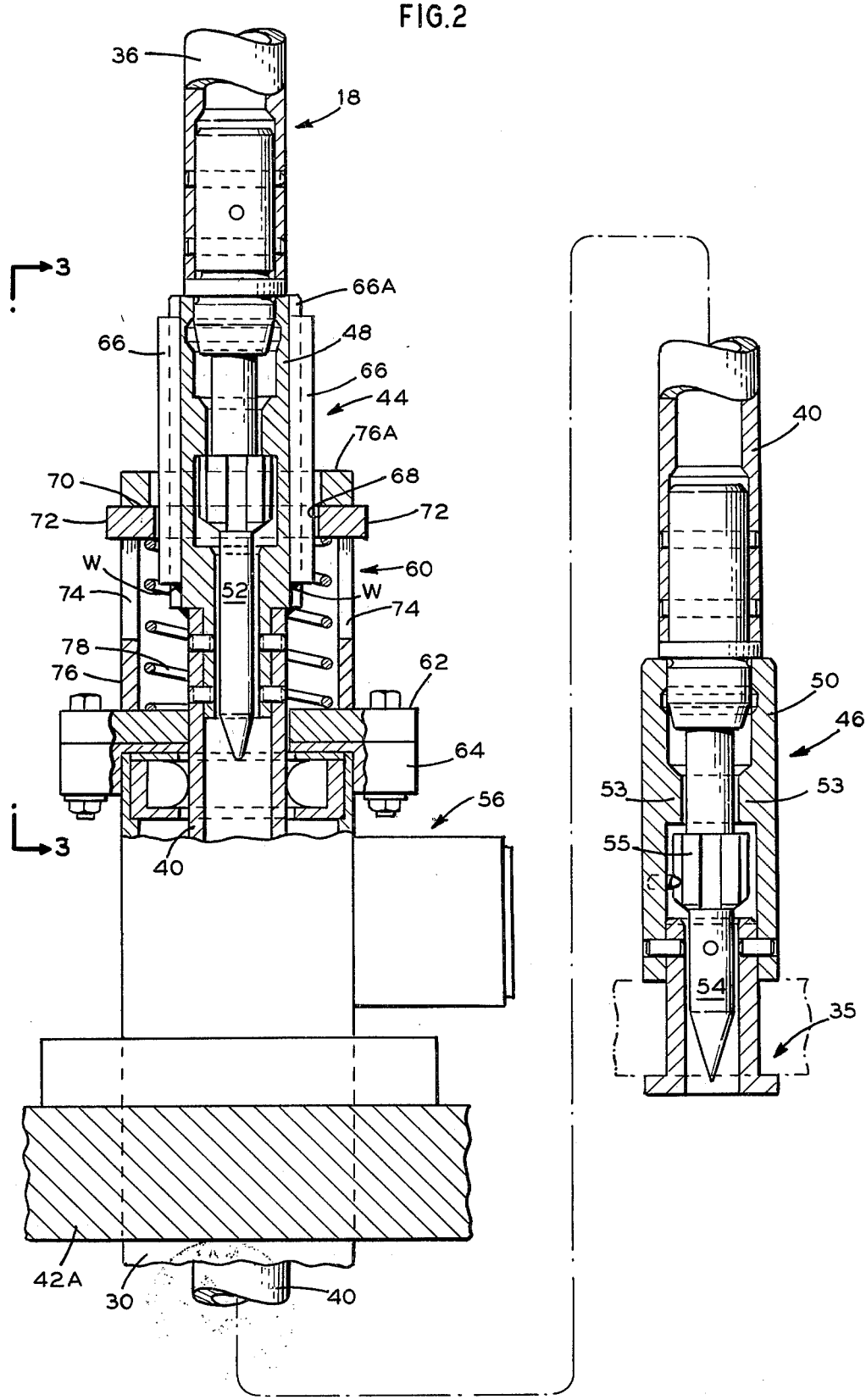
FIG. 2 is a partial sectional elevation of a portion of control rod system embodying a locking device of this invention.
Figure 3:
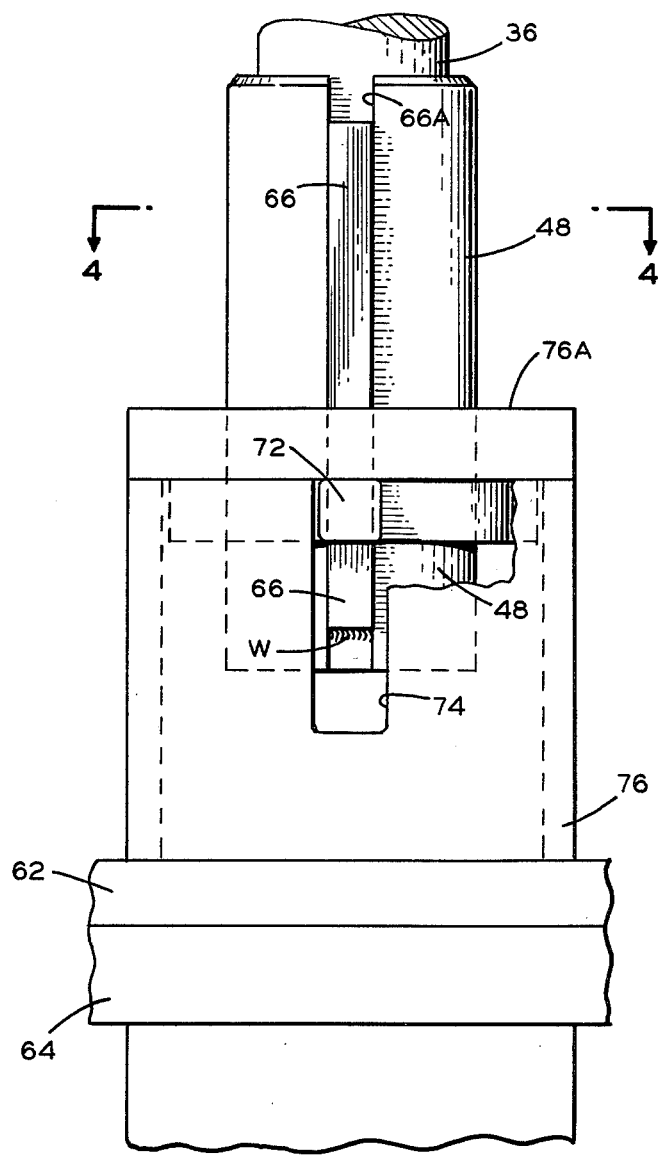
FIG. 3 is a view of a portion of the locking device of FIG. 2 in the direction of 3—3 of FIG. 2 opened in part for clarity.
Figure 4:
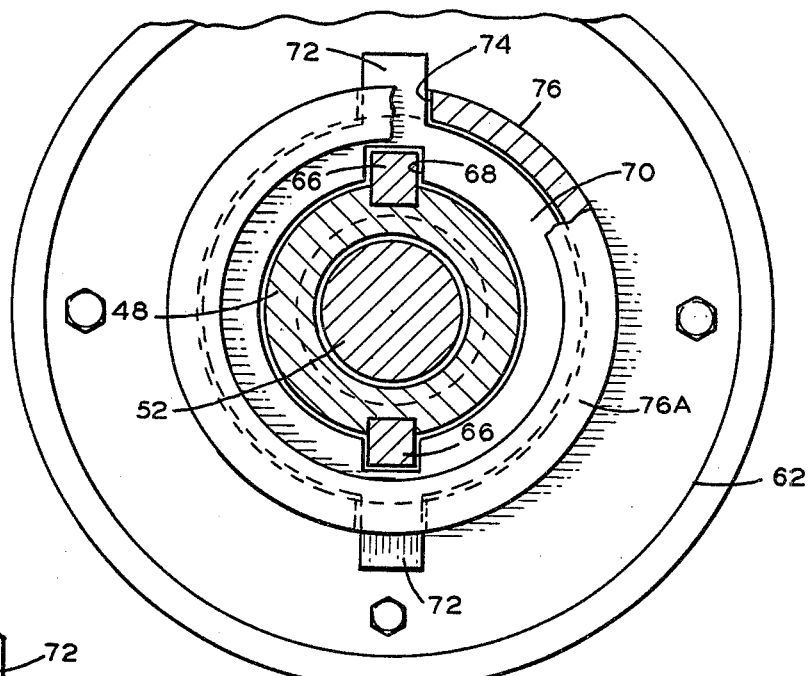
FIG. 4 is a fragmentary sectional view of the locking device of FIG. 3 in the direction 4—4.

As shown in FIGS. 1 and 2, and as described in more detail below, each control rod system 18 is an individually controlled top actuated device comprising the control rod assembly 35 including a plurality of interconnected control rods 34 coupled to a control rod drive (not shown) by means of a non rotating lead screw 36 extending through a nozzle 38, and an extension shaft 40. Each of the control rods 34 of the assembly 35, shown in FIG. 1 as being fully retracted from the fuel assembly 15, moreover, are inserted through an upper end fitting (not shown) of the fuel assembly into incore guide tubes (not shown), so that full length guidance of the control rods 34 is provided throughout the stroke by the guide tubes 30, grids $42_A$, $42_B$, $42_C$, guide assembly 32 and the in-core guide tubes.

As shown in more detail in FIG. 2, the control rod system 18 of this invention includes the control rod drive lead screw 36 coupled by means of an upper coupling 44 to one end of the extension shaft 40, which in turn is coupled by means of a similar lower coupling 46 to the control rod assembly 35. Each of the couplings 44 and 46 include a female portion 48, 50 and a corresponding male portion 52, 54 for connection thereto, respectively.

The extension shaft 40, moreover, is shown extending through the guide tube 30 which is connected to the upper internals plate or grid $42_A$. Cooperating with the shaft 40 near the upper internals grid $42_A$ is a retarding device 56 filed in the U.S. Patent Office on July 26, 1976 as U.S. Ser. No. 708,785 and an embodiment of a securing means or locking device 60 according to this invention which engages a portion of the control rod system to prevent rotation thereof. More particularly, the shaft 40 extends axially through the locking device 60 and, in addition, includes longitudinally aligned and radially extending segments, such as keys 66 for cooperation with the locking device 60. The keys 66 are disposed in keyway 66A located in the upper female portion 48 of the extension shaft coupling 44, and are fixed therein by weld W.

Figure 6:
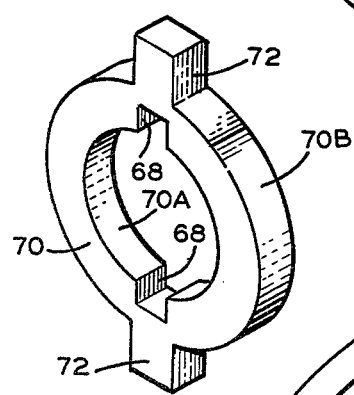
FIG. 6 is a perspective view of a portion of the locking device of the invention.

The locking device 60, moreover, includes a cylindrical housing 76 topped by an annular cap $76_A$ through which extends the shaft 40 in slideable engagement therewith. A locking ring 70 is slideably disposed within the housing 76 that is, vertically biased upwardly by a spring 78, for locking cooperation with the shaft 40 and the housing 76. In addition, the locking device is removeably connected to the grid $42_A$ by means of a flange 62 connected through a corresponding flange 64, shown here as part of the braking device 56, fixedly mounted on the grid $42_A$. The locking ring 70, more clearly seen in FIG. 6 having an inner surface $70_A$ and an outer surface $70_B$, includes slots 68 formed in the ring opening outwardly from the inner surface $70_A$ and corresponding to the keys 66 of the shaft 40. Moreover, the ring 70 includes ear portions 72 extending outwardly from the outer surface $70_B$, shown in this embodiment directly opposite the slots 68 but not necessarily limited thereto, for cooperation with a corresponding elongated slot 74 formed in the housing 76. The slots 68 and 74 allow guided translatory or reciprocal motion of the engaged shaft 40 and ring 70, respectively, while preventing rotation of the shaft about its longitudinal axis during coupling or uncoupling of the control rod assembly 35.

Figure 5:
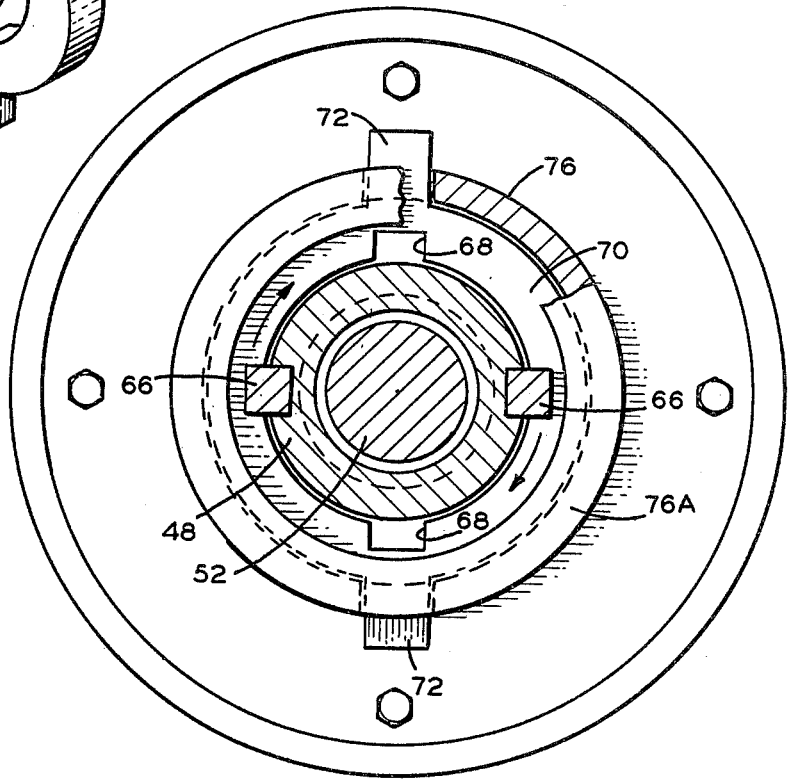
FIG. 5 is a similar view of the locking device of FIG. 3 showing the device in an unlocked position.

In operation the locking device 60 of this invention prevents the accidental uncoupling of the control rod assembly 35 from the extension shaft 40 as follows. For example, during the start up procedure, the fuel assemblies 15, each including a plurality of control rods 34 disposed in the in-core guide tubes, are positioned within the vessel 12 forming or refueling the core 14. Upon assembly of the core 14 the internals 28, that is, shroud 26, guide tubes 30, guide assembly 32, grids $42_A$, $42_B$, $42_C$ and associated extension shafts 40 aligned therein are disposed vertically above the core; and, each of the extension shafts 40 arranged in vertical alignment with a respective control rod assembly 35 or, more particularly, a portion of the lower male coupling 54 penetrates the lower female coupling 50. The coupling of the shaft 40 to the control rod assembly 35 is performed by depressing the shaft 40 downwardly and rotating the shaft about its longitudinal axis, i.e. a bayonet like coupling movement. It is to be noted that the coupling of the shaft 40 to the control rod assembly 35 also secures or locks the shaft from further rotation as discussed herein. In other words, rotating the shaft aligns splines 55 of the male portion 54 with corresponding splines 53 of the female portion 48 for slideable insertion therethrough. The downward depression of the shaft 40, moreover, slides the male portion's splines 55 through the female portion's splines 53 and, also, forces the keys 66 against the ring 70 (See FIG. 5) depressing the spring 78 and the ring 70 in the slots 74. The coupling 46 is then locked in place by a further rotation of the shaft 40 which disarranges the splines 55 and 53 and which also aligns the keys 66 with the slots 68. This movement frees the depressed ring 70 permitting the spring 78 to move the ring 70 upwardly in the slots 74 and about the shaft 40. Accordingly, this operation locks the shaft 40 to the ring 70 which in turn is locked to the housing 76 preventing rotational movement of the shaft while allowing guided translational or vertical movement thereof. Thus, the control rod system shown in FIG. 2 is situated in its lowermost downward position, and will only move upwardly out of the fuel assembly 15 and the locking device 60.

The start up procedure then comprises lowering the reactor head 13 including the control rod drive lead screws 36 on to the vessel 12 and engaging the upper coupling 44 by the same bayonet type movement as explained above in connection with the lower coupling 46, and the lead screws 36 are then secured to the control rod drive. It is to be noted, that the rotational movement of the upper coupling 44 only rotates the lead screw 36 as the extension shaft 40 and control rod assembly 35 are secured from rotation by the locking device according to this invention. In addition, once the reactor head is secured to the vessel and the control rod drive lead screw 36 is locked to the drive, translatory motion of the control rods out of the core initiates start up and further translatory motion of the rods into and out of the core in accordance with their reactor core function is allowed by the locking device.

In operation, the procedure to shut down the reactor and, for example, refuel, proceeds in the reverse order. That is, the control rods are completely inserted into the core to shut down the reactor, and accordingly the keys 66 engage the slots 68, since no rotation of the control rod system has taken place, and the shaft 40 is accordingly locked in the locking device. The lead screws are disconnected from the drive, rotated and disengaged from the extension shaft 40, again relative rotation of the shaft and the control rods is prevented by the locking device, and the head 13 and lead screws 36 are removed. In order to remove the internals 28 without removing the control rods 34 from their fuel assemblies 15 requires that the shaft 40 be uncoupled from the control rods. This is performed by depressing the ring 70 to a position which allows the shaft 40 to be rotated, aligning the splines 55 and 53 and withdrawing the shaft 40 from the control rod assembly 35. The internals 28 may then be removed and refueling of the core 14 initiated.

In accordance with the control rod system of this invention, the difficulties with respect to coupling, handling and the like of the control rod assembly of a CNSG type nuclear reactor are to a great extent alleviated. And, furthermore, an embodiment of the invention securely locks the control rod assembly with respect to rotation movement relative to its associated extension shaft preventing accidental uncoupling of the control rod assembly.

The embodiments of the invention in which an exclusive property or privilege is claimed are defined as follows:

1. An apparatus for coupling and rotatably securing a control rod system in a nuclear reactor of the type having at least one control rod assembly, a fuel assembly and drive means that longitudinally translates the control rod assembly within the fuel assembly, which comprises: a shaft disposed in axial alignment with and releasably coupled at one end to the control rod assembly, the shaft being releasably coupled at its other end to the drive means; a locking device surrounding the shaft including a housing having a longitudinally aligned slot and, a ring member having an inner slot and an outer ear portion extending through the housing slot for guided translational movement of the ring member; a key member axially aligned and outwardly extending on the shaft; the inner seat of the ring member cooperating with the key member of the shaft to permit the reciprocal movements of the control rod assembly and to secure the control rod system from rotation.

2. An apparatus according to claim 1 further comprising a spring member enclosed within the housing and engaged with the ring member for biasing the ring member in the axial direction outwardly from the fuel assembly.

3. A control rod system for a nuclear reactor including drive means, a fuel assembly and a reciprocally moveable control rod adapted for movement in the fuel assembly comprising a shaft disposed in axial alignment with and releasably coupled at one end to the rod, the shaft being releasably coupled at its other end to the drive means, locking means for securing the shaft from rotation including a spring biased ring having a inner slot, a portion of the shaft being adapted to engage and translate the ring, and upon rotation of the shaft the ring slot cooperating with said portion to prevent rotation of the shaft about the longitudinal axis of the shaft with respect to the control rod.

4. An apparatus for coupling and rotatably securing a control rod system in a nuclear reactor of the type having at least one control rod assembly, a fuel assembly, and drive means that longitudinally translates the control rod assembly within the fuel assembly, which comprises: a shaft having a radially extending key longitudinally mounted at one end; a control rod assembly coupling member mounted on the shaft, a locking device including a cylindrical housing having an elongated slot mounted about the shaft, a ring member having an outer outwardly extending portion and an inner slot, the ring member being mounted about the shaft and enclosed within the housing such that the outwardly extending portion of the ring extends into the elongated slot, and a spring member mounted within the housing for slidably biasing the ring member; the ring member being slideably responsive to engagement and movement of the key upon translation and rotation of the shaft for releasably coupling the control rod assembly coupling member to the control rod assembly, whereby the engagement of the key in the inner slot of the ring rotatably secures the shaft and the control rod assembly.

5. An apparatus as defined in claim 4, wherein the control rod assembly coupling member includes splines for releasably coupling the shaft to the control rod assembly in bayonet fashion.

6. An apparatus, as defined in claim 5, which further comprises a drive means coupling member having splines mounted on the key end of the shaft for coupling to the drive means in bayonet fashion.

* * * * *